(12) United States Patent
Lin et al.

(10) Patent No.: US 7,822,448 B2
(45) Date of Patent: *Oct. 26, 2010

(54) PROTECTIVE APPARATUS FOR A PORTABLE DEVICE

(75) Inventors: Tay-Yang Lin, Shenzhen (CN); Kuan-Hong Hsieh, Shenzhen (CN)

(73) Assignees: Ensky Technology (Shenzhen) Co., Ltd., Baoan District, Shenzhen, Guangdong Province (CN); Ensky Technology Co., Ltd., Pan Chiao, Taipei Hsien (TW)

( * ) Notice: Subject to any disclaimer, the term of this patent is extended or adjusted under 35 U.S.C. 154(b) by 671 days.

This patent is subject to a terminal disclaimer.

(21) Appl. No.: 11/759,942

(22) Filed: Jun. 8, 2007

(65) Prior Publication Data

US 2007/0287514 A1 Dec. 13, 2007

(30) Foreign Application Priority Data

Jun. 9, 2006 (CN) .................. 2006 1 0061090

(51) Int. Cl.
*H04M 1/00* (2006.01)
*H04B 1/38* (2006.01)
(52) U.S. Cl. ............... 455/575.8; 455/575.1; 455/90.3
(58) Field of Classification Search ............... 455/90.3, 455/347–349, 351, 575.1–575.4, 575.8, 66.1, 455/550.1, 556.1–556.2, 559, 566, 569.1, 455/575.6; 340/7.63, 693.3, 391.1, 396.1, 340/815.49, 815, 51, 875.73–815.74; 312/185–188, 312/246; 24/15, 41.1, 42–47; 150/105, 109, 150/112; 206/434, 389–390, 461–468, 471, 206/701–702, 758–761, 778, 745
See application file for complete search history.

(56) References Cited

U.S. PATENT DOCUMENTS

| 2004/0204165 A1 * | 10/2004 | Huang ............ 455/569.1 |
| 2005/0147951 A1 * | 7/2005 | Rohrbach ............ 434/307 R |
| 2005/0164545 A1 * | 7/2005 | Rosenthal et al. ............ 439/501 |
| 2005/0255898 A1 * | 11/2005 | Huang ............ 455/575.8 |

FOREIGN PATENT DOCUMENTS

CN 1534961 A 10/2004

* cited by examiner

*Primary Examiner*—Meless N Zewdu
(74) *Attorney, Agent, or Firm*—Winston Hsu; Scott Margo; Min-Lee Teng

(57) ABSTRACT

The invention provided a protective apparatus for a portable device and accessories of the portable device. The protective apparatus includes a sleeve housing for accommodating the portable device, a cable retainer for coiling at least part of a cable portion of the accessory of the portable device, and a receptacle for receiving at least part of a bulky portion of the accessory of the portable device. The cable retainer is fixed on a back panel of the sleeve housing includes a cable holder for coiling the cable portion therearound, and a slidable ring movable relative to the cable holder and configured for securing the coiled cable portion in position around the cable holder. The protective apparatus has a simple design for easy manipulation and removal of the cable portion as well as the bulky portion.

16 Claims, 9 Drawing Sheets

PROTECTIVE APPARATUS FOR A PORTABLE DEVICE

CROSS REFERENCE TO RELATED APPLICATIONS

This application is related to a commonly-assigned pending application filed concurrently herewith and also entitled "PROTECTIVE APPARATUS FOR A PORTABLE DEVICE". Disclosure of the above-identified application is incorporated herein by reference.

BACKGROUND

1. Technical Field

The present invention relates to a protective apparatus that is able to not only house a portable device such as a portable electronic device, but also contain an accessory of the portable device.

2. Related Art

Portable electronic devices have become smaller and more sophisticated with each new product release. These portable devices are prone to be damaged accidentally. A typical present-day protective apparatus tends to protect the portable device only, but not the accessories of the portable device. When the portable device is not used, the accessories are put beside the portable device, or separately placed in a bag or a drawer.

The U.S. Patent Application Publication 2005/0255898, entitled "Cell Phone And Holder", published on Nov. 17, 2005, discloses a cell phone holder. The cell phone holder includes a pocket for holding a cell phone, and a housing on a backing plate of the cell phone holder for accommodating an earphone cable of the cell phone. The housing is a complicated structure with a semi-automatic mechanism for controlling the extension and retraction of the cable therefrom and thereinto.

However the cell phone holder has at least the following disadvantage. Because the cable is attached to the semi-automatic mechanism, it is inconvenient for a user to remove the cable from the housing when the cable is not necessary for the cell phone.

Accordingly, what is needed is a protective holder or like protective apparatus which is not only able to provide protection for a portable device and its accessories, but which also has a simple design for easy manipulation and removal of the cable.

SUMMARY

Including in view of the foregoing disadvantages of the conventional art, the present invention provides a new advantageous protective apparatus.

A protective apparatus adapted for protecting a portable device and accessories of the portable device is provided. The protective apparatus includes: a sleeve housing for accommodating the portable device, a cable retainer for coiling at least part of a cable portion of the accessory of the portable device, and a receptacle for receiving at least part of a bulky portion of the accessory of the portable device. The sleeve housing includes a front panel, a back panel and a plurality of elastic connecting portions which interconnect the front panel and the back panel. The cable retainer provided at the back panel of the sleeve housing includes a cable holder for coiling the cable portion therearound, and a slidable ring movable relative to the cable holder and configured for securing the coiled cable portion in position around the cable holder.

A main advantage of the protective apparatus is convenient for a user to manipulate and remove the cable. At the same time, the protective apparatus provided a whole protection for the portable device and the accessories accommodated therein.

Other novel features and advantages will become more apparent from the following detailed description when taken in conjunction with the accompanying drawings, in which:

DETAILED DESCRIPTION OF THE EMBODIMENTS

Figure 1:
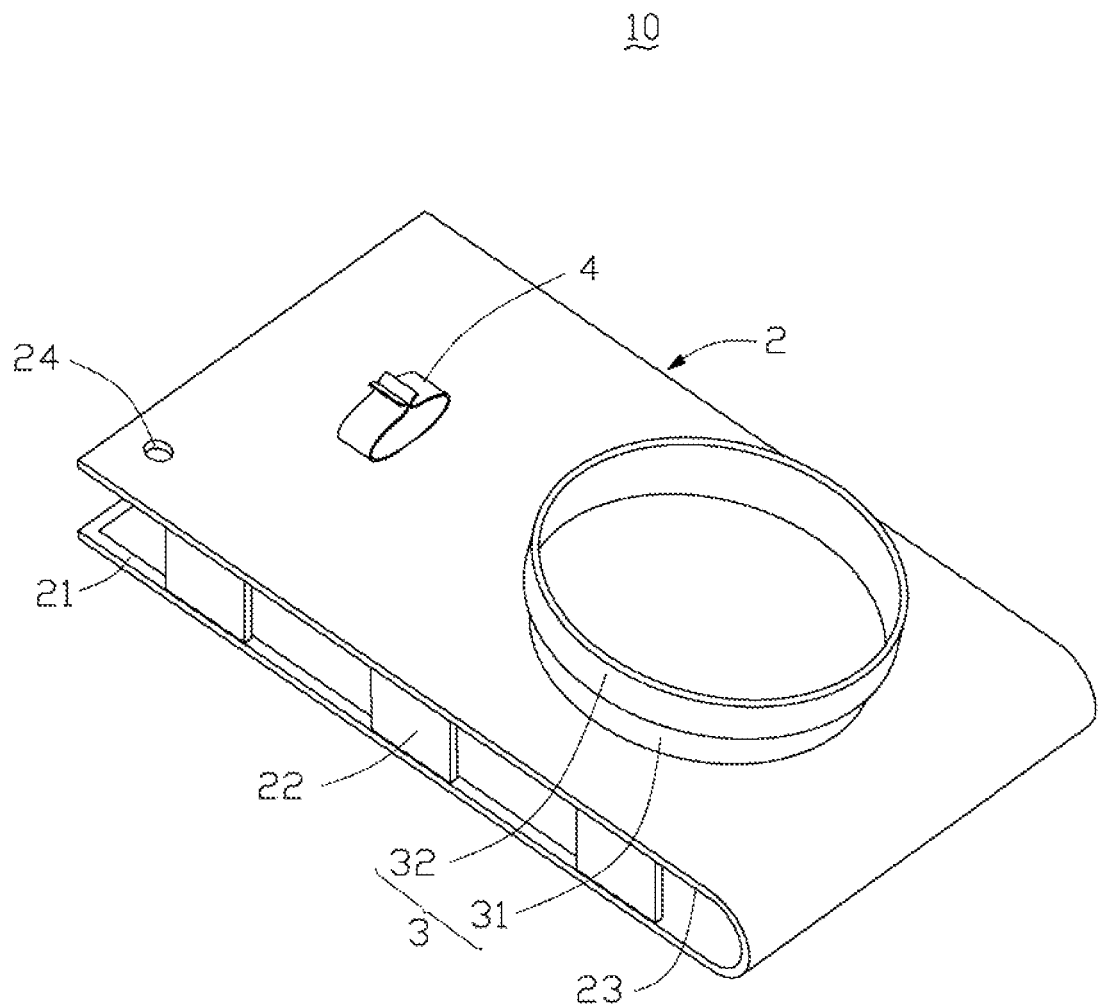
FIG. 1 is an isometric view of a protective apparatus in accordance with a first embodiment of the present invention, the protective apparatus including a back panel, a clasp, and a cable retainer having a cable holder and a slidable ring, the clasp and the cable holder both being attached to the back panel, the slidable ring shown in an extended position spaced from the back panel.

The present invention provides a protective apparatus for protecting a portable device such as a cellular phone, a media player, etc. At least three embodiments of the present invention are described hereinbelow for the purpose of illustrating principles of the protective apparatus. The protective apparatus is used to hold the portable device and one or more accessories of the portable device. The accessories typically include cable portions and bulky portions. In the embodiments described herein, an earphone assembly is provided as an exemplary accessory. The earphone assembly includes, for example, an earphone cable 71 and a pair of earpieces 6. The earphone cable 71 can be considered as a cable portion of the accessory, and the earpieces 6 can be considered as bulky portions of the accessory. In other examples, a cable portion of an accessory can be a microphone cable or a set of data lines. The bulky portion of the accessory can be a microphone, a mouthpiece of a telephone, or a Bluetooth transceiver. Accordingly, the protective apparatus typically includes a cable retainer 3 used for holding one or more cable portions, and a receptacle used for holding one or more bulky portions. The receptacle can include a clasp 4 such as that shown in FIG. 1, a pair of earpiece sockets 25 such as that shown in FIG. 6A, or a pair of grooves 26 such as that shown in FIG. 7.

Referring to FIGS. 1 to 5, aspects of a protective apparatus 10 in accordance with a first embodiment of the present invention are shown. The protective apparatus 10 includes a sleeve housing 2 for accommodating the portable device, a cable retainer 3 for coiling the earphone cable 71 therearound, and a clasp 4 for fastening the earpieces 6. That is, the clasp 4 serves as a receptacle for holding bulky portions.

Figure 2:
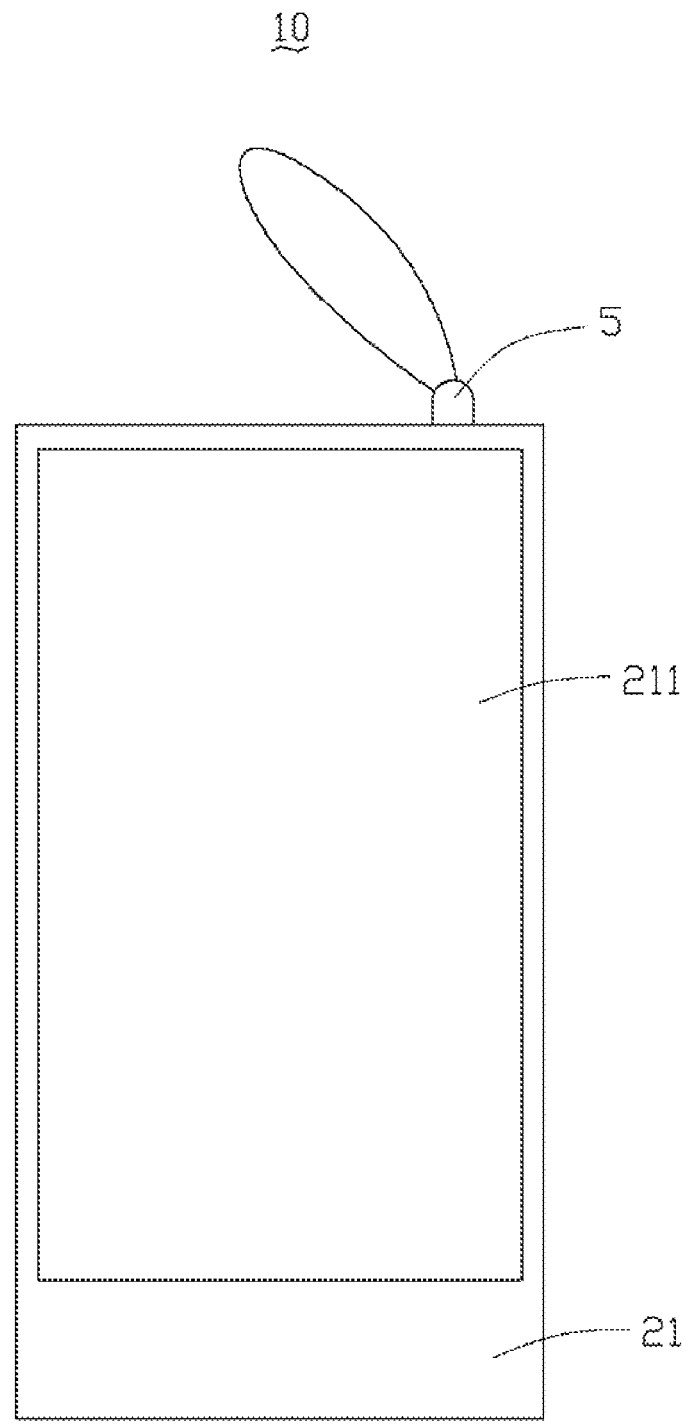
FIG. 2 is a front plan view of the protective apparatus of FIG. 1 together with a detachable handle attached thereto.
Figure 3:
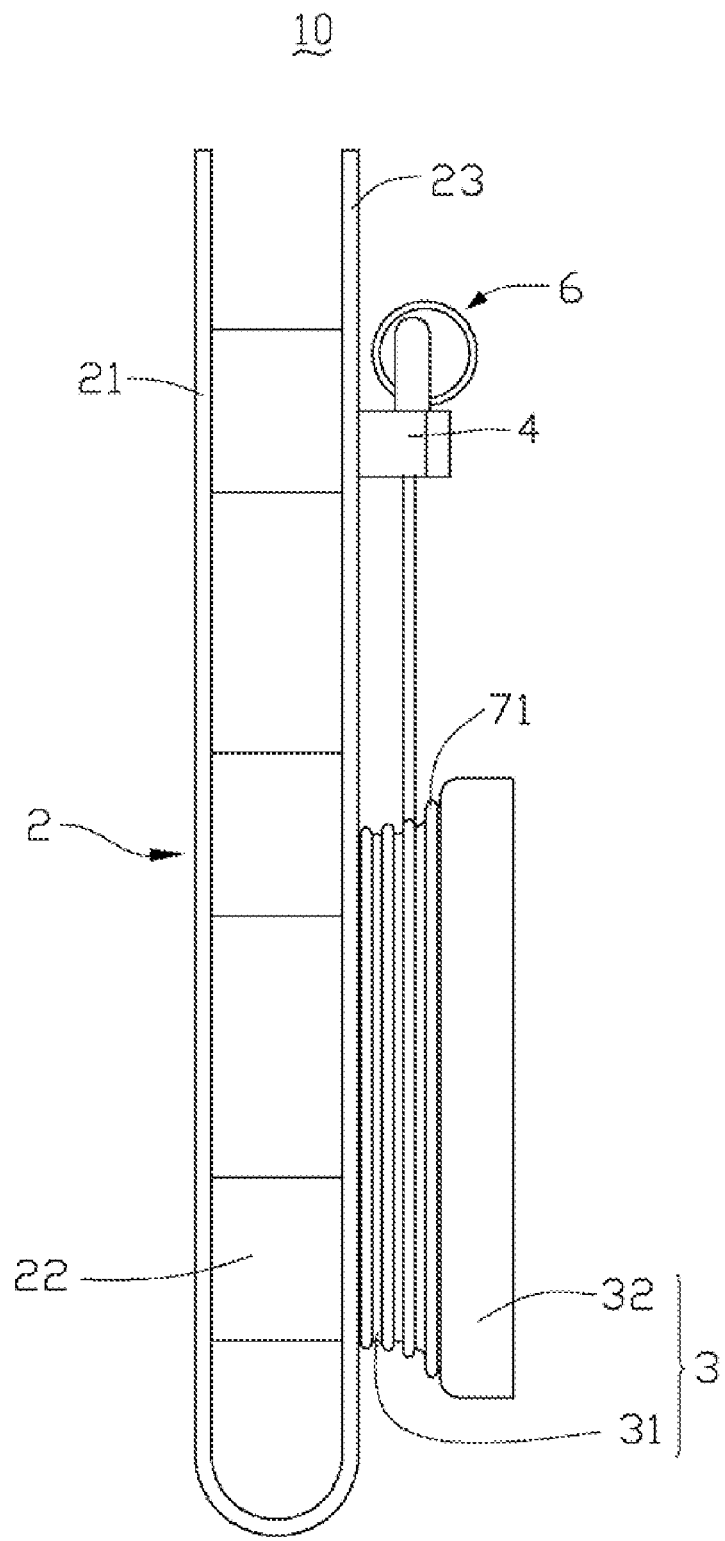
FIG. 3 is a right-side plan view of the protective apparatus of FIG. 1 together with associated accessories, the accessories including an earpiece shown ready to be fastened in a receptacle of the protective apparatus and an earphone cable shown coiled around the cable retainer.

Referring particularly to FIGS. 1 to 3, the sleeve housing 2 includes a front panel 21, a back panel 23, and a plurality of elastic connecting portions 22 which interconnect the front panel 21 and the back panel 23. In the illustrated embodiment, substantially the whole expanse of the front panel 21 is made of transparent material 211. Thereby, when the portable device is accommodated in the sleeve housing 2, information displayed on a screen of the portable device is viewable through the transparent material 211.

Figure 5:
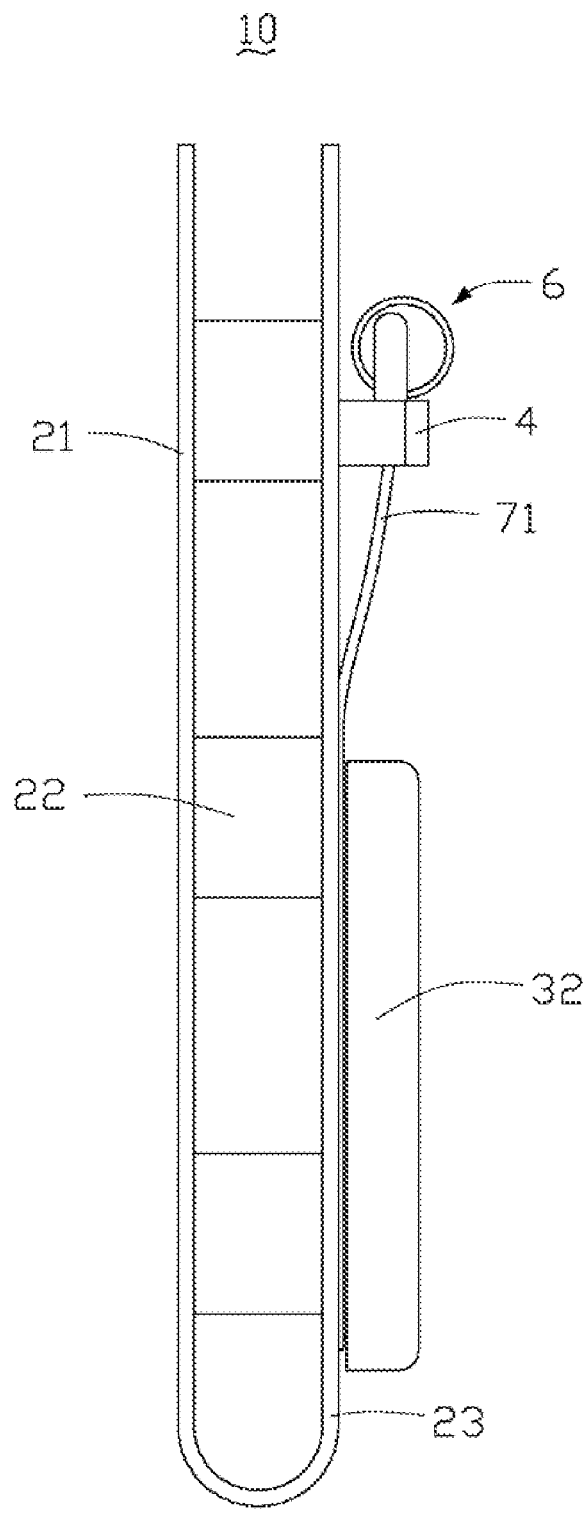
FIG. 5 is similar to FIG. 3, but showing the slidable ring in a retracted position adjacent the back panel.

Referring particularly to FIGS. 1, 3 and 5, these show an isometric view and two right-side views of the protective apparatus 10. The cable retainer 3 is fixed to or an integral part of the back panel 23 of the sleeve housing 2. The cable retainer 3 includes a cable holder 31 and a slidable ring 32. The cable holder 31 has a slightly flared cylindrical shape, and the slidable ring 32 has a substantially uniform cylindrical shape. In the illustrated embodiment, a smaller base end of the cable holder 31 is fixed to or integrally extends from the back panel 23, and an opposite larger end of the cable holder 31 is movably connected with the slidable ring 32. In particular, the slidable ring 32 is axially slidable along and relative to said opposite end of the cable holder 31. In alternative embodiments, said opposite larger end of the cable holder 31 can for example be oval or rectangular, and the slidable ring 32 can have a corresponding shape, as long as said opposite larger end of the cable holder 31 is larger than the base end of the cable holder 31. As shown in FIGS. 3 and 5, the slidable ring 32 can be in an extended position spaced from the back panel 23, or in a retracted position adjacent the back panel 23. When the slidable ring 32 is in the extended position, it is convenient for a user to coil the earphone cable 71 around the cable holder 31. When the slidable ring 32 is in the retracted position, the earphone cable 71 can be securely held between the slidable ring 32 and the cable holder 31.

Figure 4A:
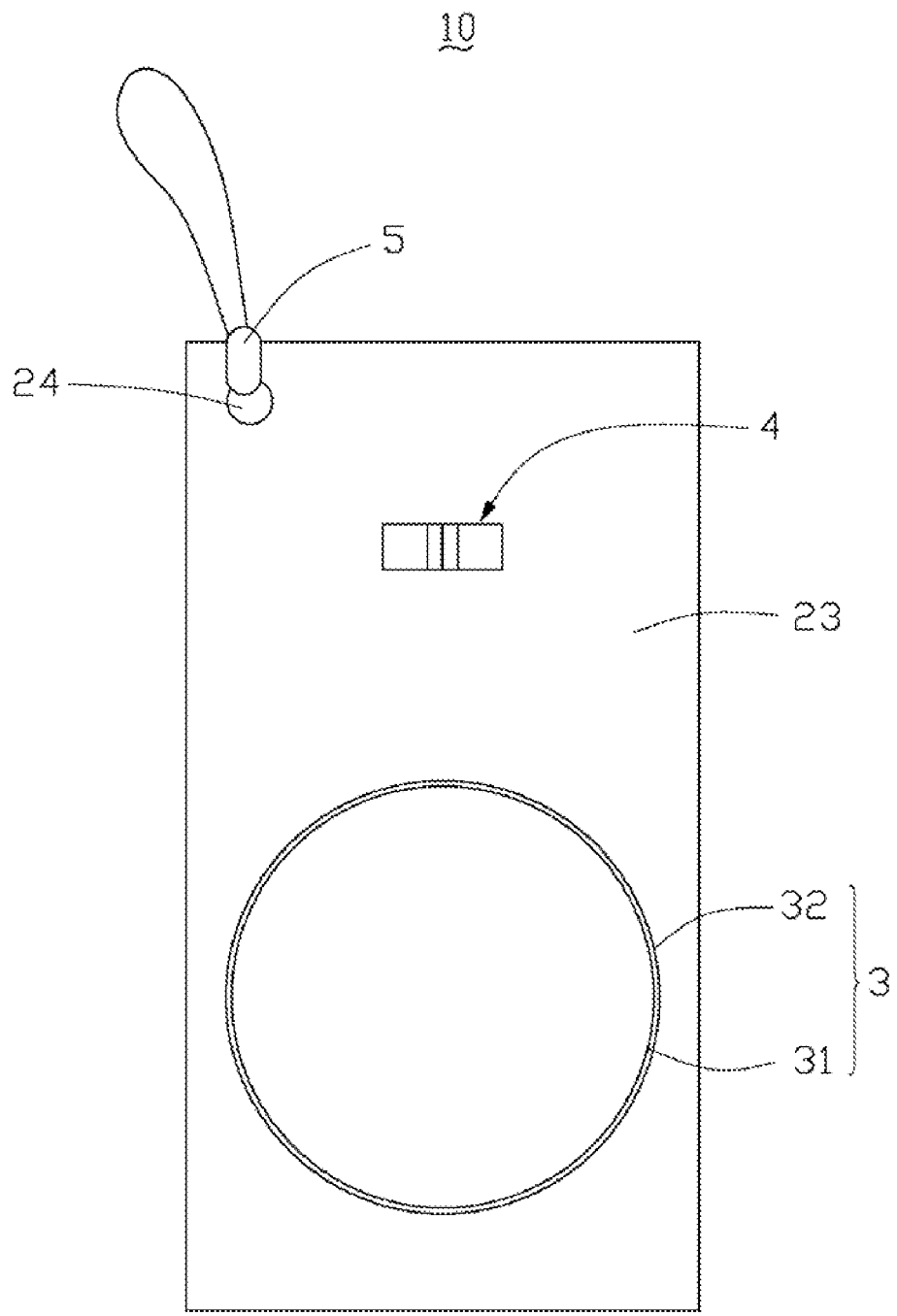
FIG. 4A is a back plan view of the protective apparatus and detachable handle of FIG. 2, showing the cable holder of the cable retainer in phantom.
Figure 4B:
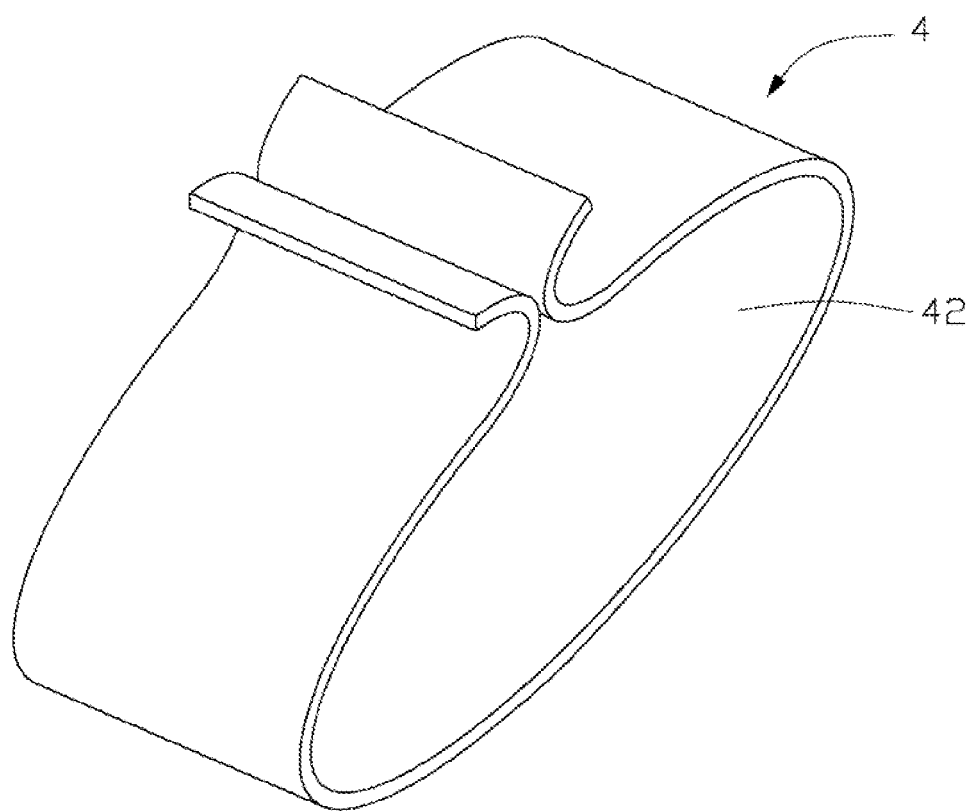
FIG. 4B is an enlarged, isometric view of the clasp of the protective apparatus of FIG. 1.

Referring particularly to FIGS. 1, 4A and 4B, the clasp 4 is fixed on or integrally extends from the back panel 23 of the sleeve housing 2. In the illustrated embodiment, the clasp 4 is essentially an elastic, elliptical ring with two ends that abut each other. The clasp 4 defines a central through opening 42, for accommodating respective stems (not labeled) of the earpieces 6 therein. The clasp 4 is preferably made of pliable material such as polyethylene, so that the ends of the clasp 4 can be manually separated from each other by a user. Thereby, an entrance is defined between the ends of the clasp 4, the entrance being in communication with the through opening 42. Thus the earphone cable 71 can first be received in the through opening 42 via the entrance, and then the stems of the earpieces can be resiliently engaged in the through opening 42.

Referring particularly to FIGS. 1 and 2, the back panel 23 of the protective apparatus 10 defines a hole 24. Thereby, a detachable handle 5 can be attached to the back panel 23. The handle 5 enables the portable device to be conveniently carried when it is retained in the protective apparatus 10. In an alternative embodiment, the hole 24 can instead be defined in the front panel 21.

When the portable device is not to be used, the protective apparatus 10 can be utilized to pack the earphone cable 71 and the earpiece 6 as follows. A first step is to pull up the slidable ring 32 to the extended position. A second step is to coil the earphone cable 71 around the cable holder 31. A third step is to push down the slidable ring 32 to the retracted position, thereby securing the earphone cable 71 inside the slidable ring 32. A last step is to insert the stems of the earpieces 6 into the through opening 42 of the clasp 4 and thereby resiliently engage the stems in the clasp 4. Thus, the portable device and the accessories are fully accommodated in and protected by the protective apparatus 10.

Figure 6A:
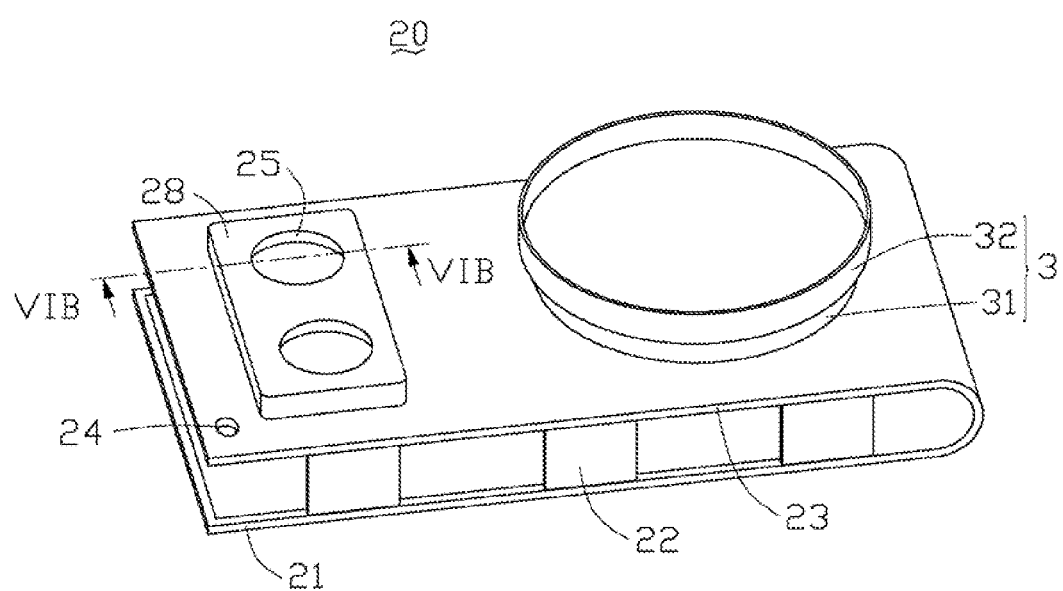
FIG. 6A is an isometric view of a protective apparatus in accordance with a second embodiment of the present invention.

FIG. 6A is an isometric view of a protective apparatus 20 in accordance with a second embodiment of the present invention. The protective apparatus 20 is similar to the above-described protective apparatus 10. However, the protective apparatus 20 includes a pedestal 28 fixed on or integrally extending from the back panel 23. The pedestal 28 essentially serves as a receptacle for holding bulky portions. In particular, the pedestal 28 includes a pair of earpiece sockets 25 for receiving the earpieces 6 therein.

Figure 6B:
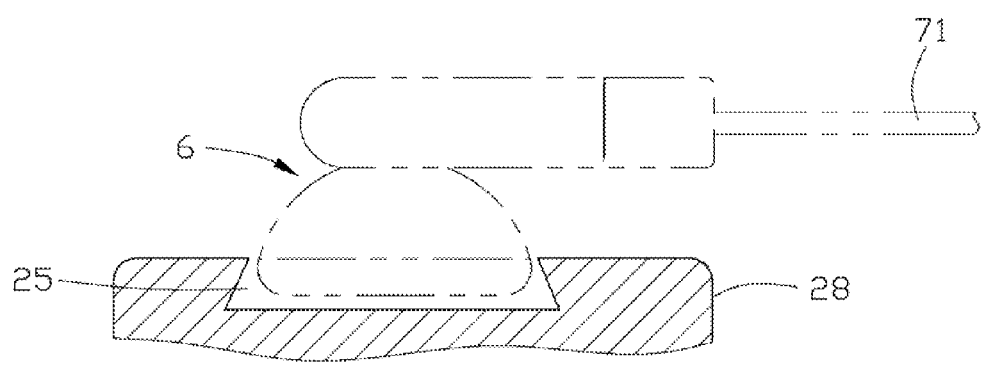
FIG. 6B is an enlarged, cross-sectional view of part of a pedestal of the protective apparatus of FIG. 6A, taken along VIB-VIB thereof, and showing in phantom an earphone portion of an earpiece engaged in an earpiece socket of the pedestal.

FIG. 6B is an enlarged, cross-sectional view of part of the pedestal 28 at one of the earpiece sockets 25, also showing in phantom one of the earpieces 6 engaged in the earpiece socket 25. A diameter of an outmost end of the earpiece socket 25 is a little less than a diameter of an inmost end of the earpiece socket 25. The pedestal 28 is typically made of rubber or similar elastic/resilient material. When each earpiece 6 is inserted into the corresponding earpiece socket 25, a rim of the earpiece socket 25 elastically deforms to allow the earpiece 6 to enter the earpiece socket 25. After the rim rebounds, the rim blocks the earpiece 6 from falling out of the earpiece socket 25. In further or alternative embodiments, inner walls of the earpiece sockets 25 can be made of or include magnetic material, so as to attract the earpieces 6 and help retain the earpieces 6 in the earpiece sockets 25. In other alternative embodiments, the pedestal 28 can be shaped and sized to accommodate other different kinds of bulky portions of accessories.

Figure 7:
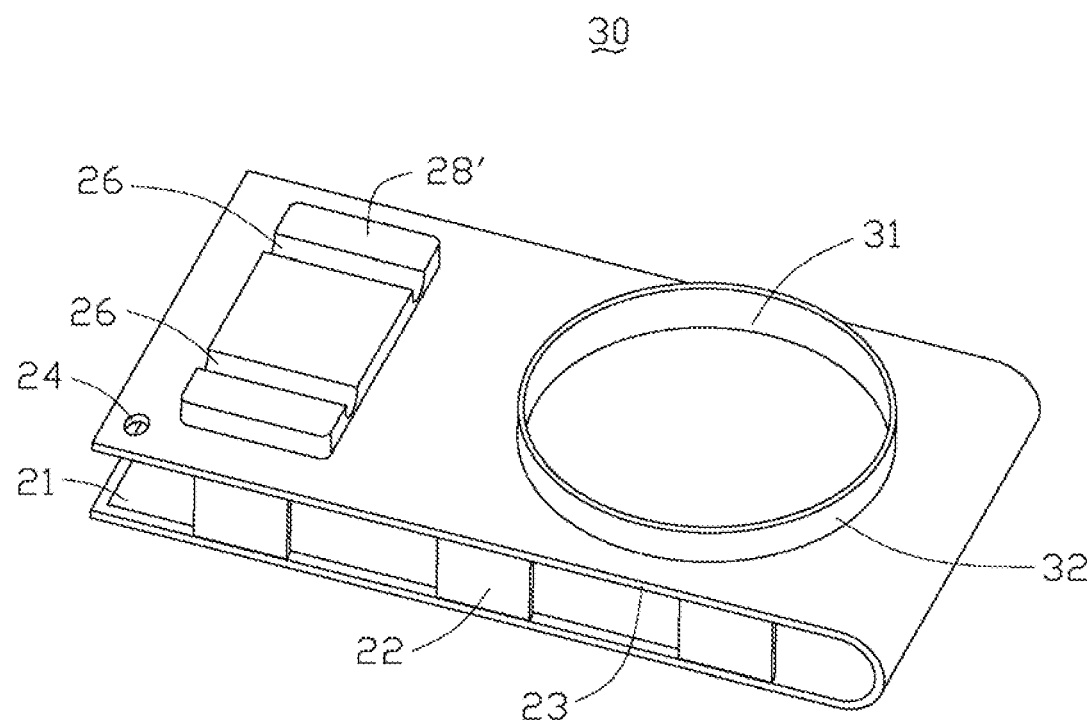
FIG. 7 is an isometric view of a protective apparatus in accordance with a third embodiment of the present invention.

FIG. 7 is an isometric view of a protective apparatus 30 in accordance with a third embodiment of the present invention. The protective apparatus 30 is similar to the above-described protective apparatus 20. However, the protective apparatus 30 includes a pedestal 28' fixed on or integrally extending from the back panel 23. The pedestal 28' essentially serves as a receptacle for holding bulky portions. In particular, the pedestal 28' defines a pair of grooves 26 at a main outer surface thereof, for retaining the stems of the earpieces 6 therein. A transverse width of an opening of each of the grooves 26 at the outer surface of the pedestal 28' is less than a corresponding width of a midsection of the groove 26 inside the pedestal 28'. Due to the resilient properties of the pedestal 28', when the stems of the earpieces 6 are inserted into the grooves 26, the wider midsections of the grooves 26 are able to accommodate the full widths of the stems of the earpieces 6, while rim portions of the pedestal 28' at the narrower openings of the grooves 26 prevent the stems of the earpieces 6 from falling out from the grooves 26.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A protective apparatus for retaining a portable device and at least one accessory of the portable device, the protective apparatus comprising:
a sleeve housing for accommodating the portable device, the sleeve housing comprising a front panel and a back panel;
a cable retainer for coiling at least part of a cable portion of the at least one accessory therearound; and
a receptacle for receiving at least part of a bulky portion of the at least one accessory;
wherein the cable retainer is provided at the back panel of the sleeve housing, and the cable retainer comprises a cable holder for coiling the cable portion of the at least one accessory therearound, and a slidable ring movable relative to the cable holder and configured for securing the coiled cable portion in position around the cable holder.

2. The protective apparatus according to claim 1, wherein the sleeve housing further comprises at least one elastic connecting portion interconnecting the front panel and the back panel.

3. The protective apparatus according to claim 2, wherein at least a part of the front panel is made of transparent material.

4. The protective apparatus according to claim 3, wherein the cable holder has a slightly flared cylindrical shape, and the slidable ring has a substantially uniform cylindrical shape.

5. The protective apparatus according to claim 4, wherein a smaller base end of the cable holder is fixed to or integrally extends from the back panel, and an opposite larger end of the cable holder is connected with the slidable ring of the cable retainer such that the slidable ring is slidable relative to the cable holder.

6. The protective apparatus according to claim 5, wherein the slidable ring is slidable between an extended position in which the slidable ring is spaced from the back panel of the sleeve housing, and a retracted position in which the slidable ring is adjacent to the back panel of the sleeve housing.

7. The protective apparatus according to claim 6, wherein the receptacle comprises a clasp fixed on or integrally extending from the back panel of the sleeve housing, and the clasp is configured for accommodating the bulky portion of the at least one accessory.

8. The protective apparatus according to claim 7, wherein the clasp is an elastic, elliptical, openable ring with two ends that abut each other.

9. The protective apparatus according to claim 8, wherein the clasp defines a central through opening for accommodating the bulky portion of the at least one accessory, and when the ends of the clasp are separated from each other, the ends define an entrance therebetween, the entrance is in communication with the central through opening, and the bulky portion of the at least one accessory is able to be received in the central through opening via the entrance.

10. The protective apparatus according to claim 6, further comprising a pedestal fixed on or integrally extending from the back panel of the sleeve housing, wherein the receptacle is configured in the pedestal.

11. The protective apparatus according to claim 10, wherein the receptacle comprises a pair of earpiece sockets.

12. The protective apparatus according to claim 11, wherein a diameter of an outmost end of each of the earpiece sockets is a little less than a diameter of an inmost end of the earpiece socket.

13. The protective apparatus according to claim 11, wherein an inner wall of each of the earpiece sockets comprises magnetic material.

14. The protective apparatus according to claim 9, wherein the receptacle comprises a pair of grooves defined at an outmost main surface of the pedestal.

15. The protective apparatus according to claim 14, wherein a transverse width of an opening of each of the grooves at the outmost main surface of the pedestal is narrower than a corresponding width of a midsection of the groove inside the pedestal.

16. The protective apparatus according to claim 1, wherein the sleeve housing has a hole defined therein, for attaching of a detachable handle to the sleeve housing.

* * * * *